Jan. 1, 1924

J. FARLEY 1,479,292

CHANGE SPEED MECHANISM

Filed Feb. 21, 1923

J. FARLEY.
Inventor.
per:- Sydney K. Page.
Attorney.

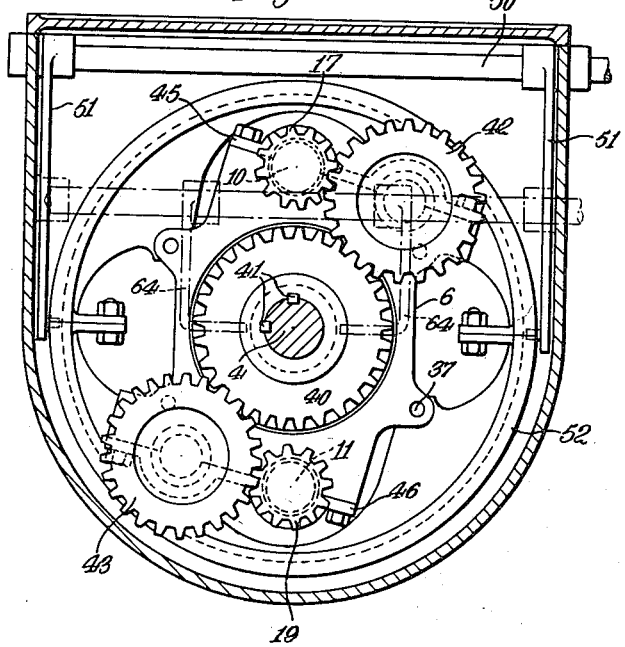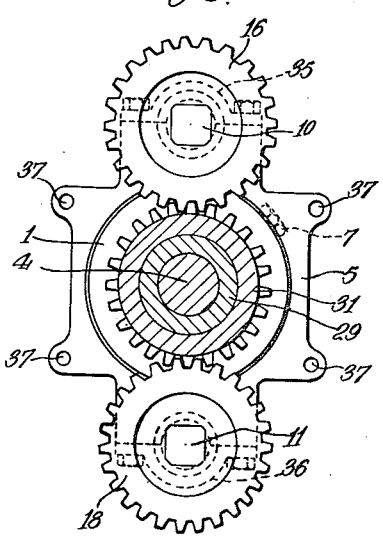

Jan. 1, 1924. 1,479,292

J. FARLEY

CHANGE SPEED MECHANISM

Filed Feb. 21, 1923 3 Sheets-Sheet 3

J. FARLEY.
Inventor.

Patented Jan. 1, 1924.

1,479,292

UNITED STATES PATENT OFFICE.

JAMES FARLEY, OF HERTFORD, ENGLAND.

CHANGE-SPEED MECHANISM.

Application filed February 21, 1923. Serial No. 620,512.

*To all whom it may concern:*

Be it known that I, JAMES FARLEY, a subject of the King of Great Britain, residing at Hertford, in the county of Hertford, England, have invented certain new and useful Improvements in Change-Speed Mechanism, of which the following is a specification.

This invention relates to improvements in change speed mechanism arranged more particularly for motor vehicles, but applicable also to other purposes where changes of speed are desired.

The object of the invention is to construct a change speed mechanism in which the forward gears may remain in mesh during the operation of changing speed and may thus avoid the loss of power due to disconnection or liability to wear or breakage of gear while changing from one speed to another.

Another object is to obtain a direct drive with the least possible transmission to inoperative elements and a further object is to include a simply actuated reverse gear.

The accompanying drawings illustrate a preferred form of the invention as arranged for the gear box of a motor-car.

Fig. 3 is an end sectional view taken on the line 3—3 of Fig. 2;

Figure 1:
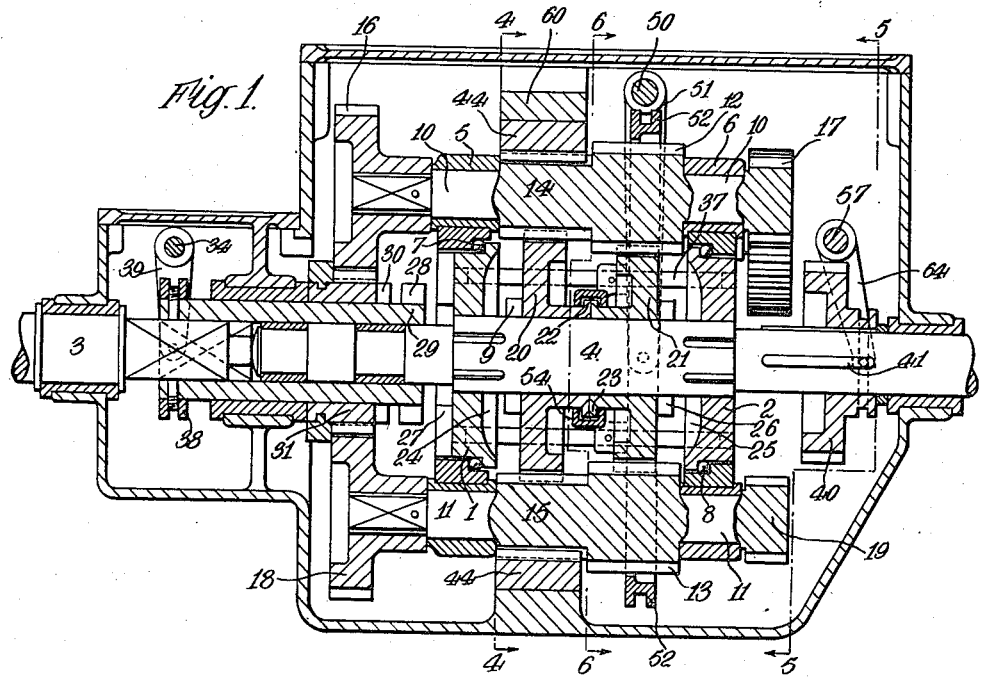
Fig. 1 is a sectional elevation of the gear including the gear box.
Figure 4:
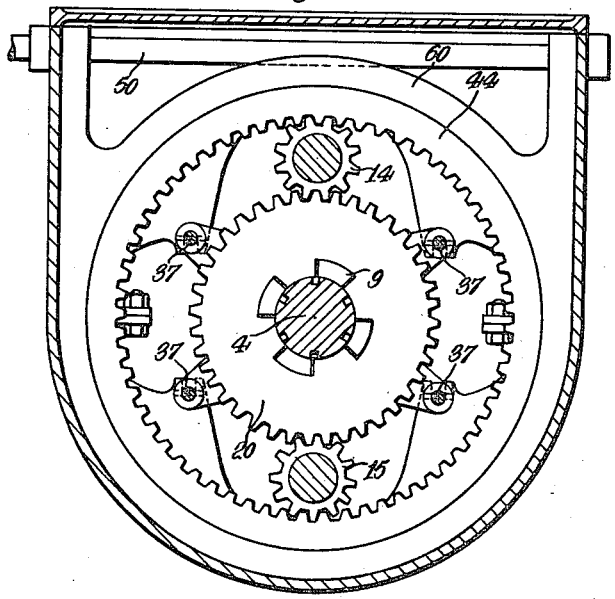
Figure 6:
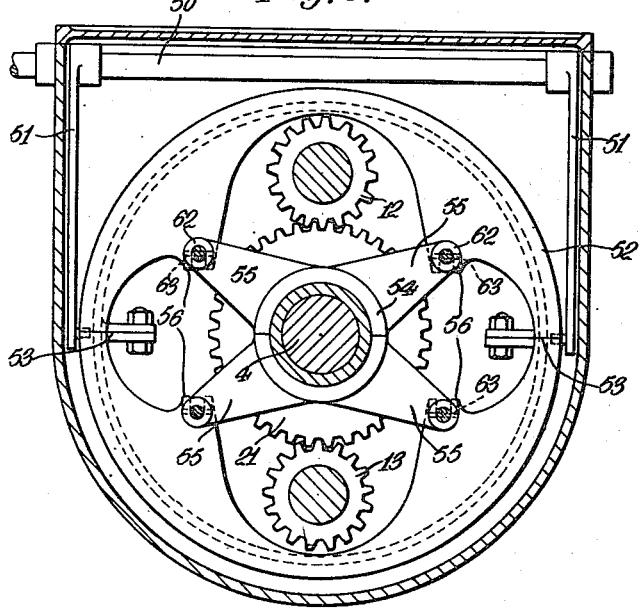

Fig. 4 is a section on the line 4—4 of Fig. 1, Figs. 5 and 6 being parallel sectional views taken on the lines 5—5 and 6—6 respectively of Fig. 1.

Figure 2:
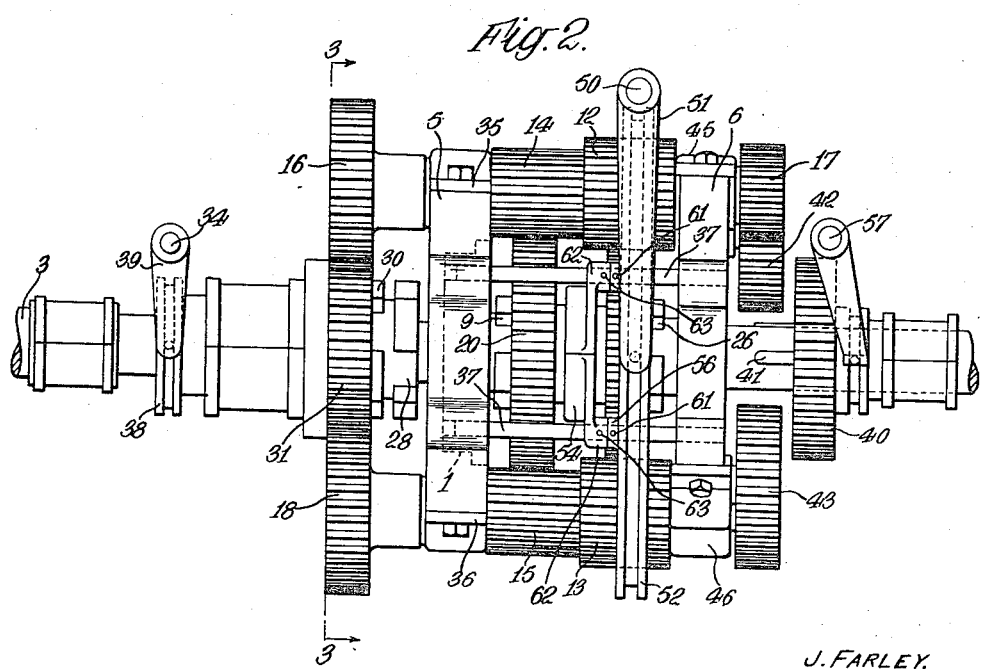
Fig. 2 is a side elevation of the gear shown in Fig. 1 with the casing removed.

Referring to Figs. 1 and 2, 1 and 2 are driving discs carried by the driven shaft 4 so as to be rotatable therewith. Upon the edges of driving discs 1 and 2 are bearing frames 5 and 6 respectively running on ball bearings 7 and 8. 10 and 11 represent two lay shafts supported in bearings carried by the frames 5 and 6, so that they are diametrically opposite to one another and form a balanced construction, and provided centrally with spur pinions 12, 13, 14, and 15 respectively between the said frames and with pinions 16, 17, 18, and 19 outside the said frames, the pinions 12 and 14 being of different diameters and the pinions 13 and 15 being similar and opposite thereto.

In addition, change wheels 20, 21, of different diameters corresponding to the two diameters of the lay shaft pinions 12, 14, and 13, 15, mesh respectively, 20 with the pinions 14 and 15, and 21 with the pinions 12 and 13. These change wheels are connected centrally by means of their flanges 22, 23, and by the selector bracket 54. This in turn is operated by the selector ring 52 and the levers 51. As well as meshing with the change wheel 20, the pinion 14 meshes also with an internally toothed stationary ring 44, located in a casing 60, the effect of this meshing being that the lay shafts 10 and 11 are carried bodily round the central shaft, and if in the forward direction, it will be seen that added revolution of the shaft 4 is gained by this means. If the number of teeth in the ring 44 is four times that in the pinion 14, four revolutions of the latter will be necessary to cause one bodily rotation of the lay shaft 10 around the driven shaft 4.

Clutch dogs 26 on the forward face of the change wheel 21 engage with clutch recesses 25 on the inner side of the disc 2 when pressed in that direction, and clutch recesses 27 on the outer face of the driving disc 1 mesh with clutch dogs 28 on a sleeve 29 carried on the squared end of a driver shaft 3, the sleeve being similarly formed internally so that it rotates with the driver shaft, but may be reciprocated thereon. Clutch recesses 30 are also provided on a central pinion 31, which is loosely carried on the sleeve 29 and meshes with the toothed wheels 16 and 18, so that when the clutch dogs 28 are withdrawn from engagement with the recesses 27 they may, after passing through a neutral position, come into gear with the clutch face 30 and thereby turn the wheels 16, 18, on the lay shafts 10 and 11 respectively. It will be seen that if the clutch dogs 28 engage the clutch recesses 27 on the driving disc 1 the driver shaft 3 will drive the shaft 4 through the medium of the parts 29, 28, 27, and 1, this being termed a direct drive, which is obtained without the intervention of any toothed wheels, and since the central pinion 31 is not fixed to the sleeve 29, none of the wheels in the gear box will revolve when the direct drive is in action.

The operation of the sleeve 29 is effected by the pivoted lever 39 carried by the cross shaft 34 and connected to a ring flange 38 on the sleeve by means of projecting pins on the said lever.

Referring to Fig. 3 it will be seen that the bearing frame 5 is provided with bearings 35 at one end and 36 at the other end to support the lay shafts 10 and 11 respectively, and on reference to Fig. 5 that the bearing frame 6 has bearings 45, 46, which not only support the lay shafts 10 and 11 but also bearings for the idle wheels 42, 43. These frames are connected by guide rods, such as 37, as shown in the figures of the drawings.

Assuming the clutch dogs 28 are in engagement with the clutch recesses 30, and the levers 51 are moved to the right of the position shown in Figs. 1 and 2 so that the change wheel 21 is pushed also to the right and its clutch dogs 26 are in engagement with the clutch recesses 25 on the disc 2, then the connection between the driver 3 and the driven shaft 4 is as follows: through the clutch 28, 30, through the toothed wheels 31, 16, and 18, through the pinion 12, the wheel 21 and cultch 25, 26, to drive the disc 2 and thereby the shaft 4. Now the change wheel 20, i. e., the change wheel juxtaposed to the sleeve 31, is provided on its outer side with clutch dogs 9 which, when the levers 51 are moved to the left of the position shown in Figs. 1 and 2, may engage clutch recesses 24 on the inner side of the driving disc 1, a corresponding rotation of the driven shaft 4 taking place, but at a different speed, owing to the smaller diameter of the pinion 14 in proportion to the change wheel 20. Consequently, the shaft 4, although at a lower speed, will be driven with greater power. Towards the right hand end of the shaft 4 (see Figs. 1, 2 and 5) is mounted a toothed wheel 40 connected by feathers 41 to the shaft so that it may rotate therewith, but can slide thereon.

In order to transmit a reverse drive to the shaft 4 from the lay shafts 10, 11, the idle wheels 42, 43, are connected by moving the toothed wheel 40 along the shaft 4 until it engages with both; the idle wheels 42, 43, being always driven from their respective lay shafts through the outside pinions 17 and 19, a reverse motion is imparted to the wheel 40 and the shaft 4.

The central reversing wheel 40 may be moved by levers 64 operated from a third control shaft 57.

Referring to Figs. 4 and 6, disposition of the low speed pinions 14, 15, in gear with the clutch faced wheel 20, and the pinions 12, 13, in gear with the clutch faced wheel 21 will be readily understood.

The control gear for operating the change wheels 20 and 21 as shown in Fig. 6 consists of the shaft 50 and the levers 51 which operate the divided selector ring 52 whose parts are connected at the points 53 so that recessed bosses 56 formed thereon (Figs. 2 and 6) can be put into place over the guide rods 37, to which the selector ring is fixed, e. g., by pins 61 passed through the said bosses and the rods 37. Associated with this selector ring 52 is a selector bracket 54 (Fig. 6) having lugs 55 which extend outwards to the guide rods 37, each outer extremity of the lugs 55 being provided with a boss 62 formed for the reception of the rods 37, which are fixed, e. g., by pins 63 to the bosses 62, the selector bracket 54 being channelled to embrace flanges 22, 23, of the wheels 20, 21, respectively (see Fig. 1). The bosses 62 of the lugs 55 of the selector bracket 54 abut against the bosses 56 on the selector ring 52, and being connected by the rods 37 serve to move the change wheels 20, 21 longitudinally on the shaft 4 when the levers 51 are actuated. By this means, the clutch face 26 is brought into engagement with the clutch face 25, or the clutch face 9 into engagement with the wheel 1, the shaft 4 rotating accordingly.

By following out the transmission through a single train, say, for example, the train of wheels comprised by 31, 16, 12 and 21, it will be seen that a certain number of revolutions would be given to the second motion shaft 4 in the ordinary way, assuming the lay shaft 10 was running in fixed bearings. Since, however, the lay shaft 10 is movable and the pinion 14 is in mesh with the internally toothed stationary ring 44, additional revolutions are given to the change wheel 21 and result in an extra rotation of that wheel and consequently of the driving disc 2 for each four revolutions of the pinion 14, which takes it round the internally toothed ring 44 on the assumption that the proportions of the teeth of the latter to the pinion 14 are as 4 to 1.

The levers 51, the levers 39, and the levers 64 are connected for actuation conveniently to a driver's hands, and the levers may be interconnected so that when a lever is actuated the others are in position, assuring that the respective controlled elements will not be adversely affected.

It will be understood that the invention is not limited to the construction shown, as an efficient arrangement could be obtained with only one lay shaft, while, of course, one, or more than two, pinions may be arranged on a lay shaft and corresponding change wheels on the driven shaft to obtain one or more changes.

I claim:—

1. Change speed mechanism having in combination a driver shaft, a driven shaft, a clutch adapted to directly connect said shafts, a lay shaft, gear connecting the driver shaft and lay shaft, frames carrying said lay shaft, bearings for rotatably supporting said frames, a pinion on said lay shaft, a toothed change wheel meshing with said pinion, means for detachably connecting said change wheel with said driven shaft as required for rotation therewith, and a stationary internally toothed ring member coaxial with the driven shaft meshing with said pinion on the lay shaft.

2. Change speed mechanism having in combination a driver shaft, a driven shaft, a clutch adapted to directly connect said hafts, a lay shaft, gear connecting the driver shaft and lay shaft, discs mounted for rotation with said driven shaft, a frame carried on each said disc, said frames carrying said lay shaft, a pinion on said lay shaft, a toothed change wheel meshing with said pinion and slidable on said driven shaft, a clutch face on one of said discs, a complementary face on said change wheel, shifting means for engaging or disengaging the clutch faces on said change wheel and disc, and a stationary internally toothed ring member coaxial with the driven shaft meshing with said pinion on the lay shaft.

3. Change speed mechanism having in combination a driver shaft, a sleeve slidably mounted on said shaft but rotatable therewith, a clutch face on said sleeve, a pinion loosely mounted on said sleeve, a clutch face on said pinion complementary to the clutch face on said sleeve, a driven shaft, discs mounted for rotation with said driven shaft, a frame carried by each said disc, a lay shaft carried by said frames, gear connecting the driver shaft and lay shaft, a clutch face complementary to the clutch face on said sleeve on the one of the said discs juxtaposed to the said sleeve, actuating gear for moving the sleeve to engage its clutch face with the said complementary clutch faces, a pinion on said lay shaft, a toothed change wheel meshing with said lay shaft pinion, and slidable on said driven shaft, a clutch face on one of said discs, a complementary face on said change wheel, shifting means for engaging or disengaging the clutch faces on said change wheel and disc, and a stationary internally toothed ring member coaxial with the driven shaft meshing with said pinion on the lay shaft.

4. Change speed mechanism having in combination a driver shaft, a driven shaft, a clutch adapted to directly connect said hafts, a lay shaft, gear connecting the driver shaft and lay shaft, discs mounted for rotation with said driven shaft, a frame carried on each said disc, said frames carrying said lay shaft, a pinion on said lay shaft, a toothed change wheel meshing with said pinion and slidable on said driven shaft, a clutch face on one of said discs, a complementary face on said change wheel, shifting means for engaging or disengaging the clutch faces on said change wheel and disc, a stationary internally toothed ring member coaxial with the driven shaft meshing with said pinion on the lay shaft, and reversing gear including a pinion slidably mounted on the driven shaft, but rotatable therewith, a pinion on said lay shaft, an idle wheel meshing with said pinion of the reversing gear on said lay shaft, and actuating means for reciprocating the pinion on the driven shaft into and out of engagement with the said idle wheel.

5. Change speed mechanism having in combination a driver shaft, a sleeve slidably mounted on said shaft, but, rotatable therewith, a clutch face on said sleeve, a pinion loosely mounted on said sleeve, a clutch face on said pinion complementary to the clutch face on said sleeve, a driven shaft, discs mounted for rotation with said driven shaft, a frame carried by each said disc, a lay shaft carried by said frames, gear connecting the driver shaft and lay shaft, a clutch face complementary to the clutch face on said sleeve on the one of said discs juxtaposed to the said sleeve, actuating gear for moving the sleeve to engage its clutch face with the said complementary clutch faces, a pinion on said lay shaft, a toothed change wheel meshing with said lay shaft pinion, and slidable on said driven shaft, a clutch face on one of said discs, a complementary face on said change wheel, shifting means for engaging or disengaging the clutch faces on said change wheel and disc, a stationary internally toothed ring member coaxial with the driven shaft meshing with said pinion on the lay shaft, and reversing gear including a pinion slidably mounted on the driven shaft but rotatable therewith, a pinion on said lay shaft, an idle wheel meshing with said pinion of the reversing gear on said lay shaft, and actuating means for reciprocating the pinion on the driven shaft into and out of engagement with the said idle wheel.

6. Change speed mechanism having in combination a driver shaft, a driven shaft, a clutch adapted to directly connect said shafts, a lay shaft, gear connecting the driver shaft and lay shaft, a pair of discs mounted for rotation with said driven shaft, a frame mounted on each said disc, said frames carrying said lay shaft, two pinions of different diameters on said lay shaft, toothed change wheels of diameters corresponding to the diameters of said pinions, slidable on said driven shaft between said discs and meshing with said pinions, a clutch face on the inner side of each said disc, a complementary clutch face on the juxtaposed change wheels, shifting means for engaging or disengaging the respective complementary clutch faces on said change wheels and said discs, and a stationary internally toothed ring member coaxial with the driven shaft meshing with one of the pinions on the lay shaft.

7. Change speed mechanism having in combination a driver shaft, a sleeve slidably mounted on said shaft but rotatable therewith, a clutch face on said sleeve, a pinion loosely mounted on said sleeve, a clutch face on said pinion complementary to the clutch face on said sleeve, a driven shaft, a pair of discs mounted for rotation with said driven shaft, a frame carried by each said disc, a lay shaft carried by said frames, gear connecting the driver shaft and lay shaft, a clutch face complementary to the clutch face on said sleeve on the one of said discs juxtaposed to the said sleeve, actuating gear for moving the sleeve to engage its clutch face with the said complementary clutch faces, two pinions of different diameters on said lay shaft, toothed change wheels of diameters corresponding to the diameters of said lay shaft pinions, slidable on said driven shaft between said discs and meshing with said lay shaft pinions, a clutch face on the inner side of each said disc, a complementary clutch face on the juxtaposed change wheels, shifting means for engaging or disengaging the respective complementary clutch faces on said change wheels and said discs, and a stationary internally toothed ring member coaxial with the driven shaft meshing with one of the pinions on the lay shaft.

8. Change speed mechanism having in combination a driver shaft, a driven shaft, a clutch adapted to directly connect said shafts, a lay shaft, gear connecting the driver shaft and lay shaft, a pair of discs mounted for rotation with said driven shaft, a frame mounted on each said disc, said frames carrying said lay shaft, two pinions of different diameters on said lay shaft, toothed change wheels of diameters corresponding to the diameters of said pinions, slidable on said driven shaft between said discs and meshing with said pinions, a clutch face on the inner side of each said disc, a complementary clutch face on the juxtaposed change wheels, shifting means for engaging or disengaging the respective complementary clutch faces on said change wheels and said discs, a stationary internally toothed ring member coaxial with the driven shaft meshing with one of the pinions on the lay shaft, and reversing gear including a pinion slidably mounted on the driven shaft but rotatable therewith, a pinion on said lay shaft, an idle wheel meshing with said pinion of the reversing gear on said lay shaft, and actuating means for reciprocating the pinion on the driven shaft into and out of engagement with the said idle wheel.

9. Change speed mechanism having in combination a driver shaft, a sleeve slidably mounted on said shaft but rotatable therewith, a clutch face on said sleeve, a pinion loosely mounted on said sleeve, a clutch face on said pinion complementary to the clutch face on said sleeve, a driven shaft, a pair of discs mounted for rotation with said driven shaft, a frame carried by each said disc, a lay shaft carried by said frames, gear connecting the driver shaft and lay shaft, a clutch face complementary to the clutch face on said sleeve on the one of said discs juxtaposed to the said sleeve, actuating gear for moving the sleeve to engage its clutch face with the said complementary clutch faces, two pinions of different diameters on said lay shaft, toothed change wheels of diameters corresponding to the diameters of said lay shaft pinions, slidable on said driven shaft between said discs, and meshing with said lay shaft pinions, a clutch face on the inner side of each said disc, a complementary clutch face on the juxtaposed change wheels, shifting means for engaging or disengaging the respective complementary clutch faces on said change wheels and said discs, a stationary internally toothed ring member coaxial with the driven shaft meshing with one of the pinions on the lay shaft, and reversing gear including a pinion slidably mounted on the driven shaft but rotatable therewith, a pinion on said lay shaft, an idle wheel meshing with said pinion of the reversing gear on said lay shaft, and actuating means for reciprocating the pinion on the driven shaft into and out of engagement with the said idle wheel.

10. Change speed mechanism having in combination a driver shaft, a driven shaft, a clutch adapted to directly connect shafts, a lay shaft, gear connecting the driver shaft and lay shaft, a pair of discs mounted for rotation with said driven shaft, a frame mounted on each said disc, said frames carrying said lay shaft, two pinions of different diameters on said lay shaft, toothed change wheels of diameters corresponding to the diameters of said pinions, slidable on said driven shaft between said discs and meshing with said pinions, a clutch face on the inner side of each said disc, a complementary clutch face on the juxtaposed change wheels, rods connecting said frames and slidable relatively thereto, a bracket connecting said toothed change wheels and fitted to said rods, a ring arranged transversely of the driven shaft and connected to said rods, actuating gear for moving said ring in both directions longitudinally of the driven shaft, whereby the complementary clutch faces on said change wheels may be placed in and out of engagement with the respective clutch faces on said discs, and a stationary internally toothed ring member coaxial with the driven shaft meshing with one of the pinions on the lay shaft.

11. Change speed mechanism having in combination a driver shaft, a sleeve slidably mounted on said shaft but rotatable therewith, a clutch face on said sleeve, a pinion loosely mounted on said sleeve, a clutch face on said pinion complementary to the clutch face on said sleeve, a driven shaft, a pair of discs mounted for rotation with said driven shaft, a frame carried by each said disc, a lay shaft carried by said frames, gear connecting the driver shaft and lay shaft, a clutch face complementary to the clutch face on said sleeve on the one of said discs juxtaposed to the sleeve, actuating gear for moving the sleeve to engage its clutch face with the said complementary clutch faces, two pinions of different diameters on said lay shaft, toothed change wheels of diameters corresponding to the diameters of said lay shaft pinions, slidable on said driven shaft between said discs and meshing with said lay shaft pinions, a clutch face on the inner side of each said disc, a complementary clutch face on the juxtaposed change wheels, rods connecting said frames and slidable relatively thereto, a bracket connecting said toothed change wheels and fitted to said rods, a ring arranged transversely of the driven shaft and connected to said rods, actuating gear for moving said ring in both directions longitudinally of the driven shaft, whereby the complementary clutch faces on said change wheels may be placed in and out of engagement with the respective clutch faces on said discs, and a stationary internally toothed ring member coaxial with the driven shaft meshing with one of the pinions on the lay shaft.

12. Change speed mechanism having in combination a driver shaft, a driven shaft, a clutch adapted to directly connect said shafts, a lay shaft, gear connecting the driver shaft and lay shaft, a pair of discs mounted for rotation with said driven shaft, a frame mounted on each said disc, said frames carrying said lay shaft, two pinions of different diameters on said lay shaft, toothed change wheels of diameters corresponding to the diameters of said pinions, slidable on said driven shaft between said discs and meshing with said pinions, a clutch face on the inner side of each said disc, a complementary clutch face on the juxtaposed change wheels, rods connecting said frames and slidable relatively thereto, a bracket connecting said toothed change wheels and fitted to said rods, a ring arranged transversely of the driven shaft and connected to said rods, actuating gear for moving said ring in both directions longitudinally of the driven shaft, whereby the complementary clutch faces on said change wheels may be placed in and out of engagement with the respective clutch faces on said discs, a stationary internally toothed ring member coaxial with the driven shaft meshing with one of the pinions on the lay shaft, and reversing gear including a pinion slidably mounted on the driven shaft but rotatable therewith, a pinion on said lay shaft, an idle wheel meshing with said pinion of the reversing gear on said lay shaft, and actuating means for reciprocating the pinion on the driven shaft into and out of engagement with the said idle wheel.

13. Change speed mechanism having in combination a driver shaft, a sleeve slidably mounted on said shaft but rotatable therewith, a clutch face on said sleeve, a pinion loosely mounted on said sleeve, a clutch face on said pinion complementary to the clutch face on said sleeve, a driven shaft, a pair of discs mounted for rotation with said driven shaft, a frame carried by each said disc, a lay shaft carried by said frames, gear connecting the driver shaft and lay shaft, a clutch face complementary to the clutch face on said sleeve on the one of said discs juxtaposed to the said sleeve, actuating gear for moving the sleeve to engage its clutch face with the said complementary clutch faces, two pinions of different diameters on said lay shaft, toothed change wheels of diameters corresponding to the diameters of said lay shaft pinions, slidable on said driven shaft between said discs and meshing with said lay shaft pinions, a clutch face on the inner side of each said disc, a complementary clutch face on the juxtaposed change wheels, rods connecting said frames and slidable relatively thereto, a bracket connecting said toothed change wheels and fitted to said rods, a ring arranged transversely of the driven shaft and connected to said rods, actuating gear for moving said ring in both directions longitudinally of the driven shaft, whereby the complementary clutch faces on said change wheels may be placed in and out of engagement with the respective clutch faces on said disc, a stationary internally toothed ring member coaxial with the driven shaft meshing with one of the pinions on the lay shaft, and reversing gear including a pinion slidably mounted on the driven shaft, but rotatable therewith, a pinion on said lay shaft, an idle wheel meshing with said pinion of the reversing gear on said lay shaft, and actuating means for reciprocating the pinion on the driven shaft into and out of engagement with the said idle wheel.

14. Change speed mechanism having in combination a driver shaft, a driven shaft, a clutch adapted to directly connect said shafts, a pair of diametrically opposite lay shafts, gear connecting the driver shaft to each lay shaft, frames carrying said lay shafts, bearings for rotatably supporting said frames, two pinions of different diameters on one of said lay shafts, similar pinions opposite thereto on the other said lay shaft, toothed change wheels of different diameters corresponding to the two diameters of said pinions, means for detachably connecting each of said change wheels separately with said driven shaft as required for rotation therewith, and a stationary internally toothed ring member coaxial with the driven shaft meshing with one of the pinions on a lay shaft, and the opposite pinion of the other lay shaft.

15. Change speed mechanism having in combination a driver shaft, a driven shaft, a clutch adapted to directly connect said shafts, a pair of diametrically opposite lay shafts, gear connecting the driver shaft with said lay shafts, a pair of discs mounted for rotation with said driven shaft, a frame mounted on each said disc, said frames carrying said lay shafts, two pinions of different diameters on one of said lay shafts, similar pinions opposite thereto on the other said lay shaft, toothed change wheels of different diameters corresponding to the two diameters of said pinions, slidable on said driven shaft between said discs and meshing with the said pinions on each lay shaft, a clutch face on the inner side of each said disc, a complementary clutch face on the juxtaposed change wheels, shifting means for engaging or disengaging the respective complementary clutch faces on said change wheels and said discs, and a stationary internally toothed ring member coaxial with the driven shaft meshing with one of the pinions on a lay shaft and the opposite pinion of the other lay shaft.

16. Change speed mechanism having in combination a driver shaft, a sleeve slidably mounted on said shaft but rotatable therewith, a clutch face on said sleeve, a pinion loosely mounted on said sleeve, a clutch face on said pinion complementary to the clutch face on said sleeve, a driven shaft, a pair of discs mounted for rotation with said driven shaft, a frame carried on the edge of each said disc, a pair of diametrically opposite lay shafts carried by said frames, gear connecting the driver shaft and lay shafts, a clutch face complementary to the clutch face on said sleeve on the one of said discs juxtaposed to the said sleeve, actuating gear for moving the sleeve to engage its clutch face with the said complementary clutch faces, two pinions of different diameters on one of said lay shafts, similar pinions opposite thereto on the other said lay shaft, toothed change wheels of different diameters corresponding to the two diameters of the lay shaft pinions, slidable on said driven shaft between said discs and meshing with the said pinions on each lay shaft, a clutch face on the inner side of each said disc, a complementary clutch face on the juxtaposed change wheels, rods connecting said frames and slidable relatively thereto, a bracket connecting said toothed change wheels and fitted to said rods, a ring arranged transversely of the driven shaft and connected to said rods, actuating gear for moving said ring in both directions longitudinally of the driven shaft, whereby the complementary clutch faces on said change wheels may be placed in and out of engagement with the respective clutch faces on said disc, a stationary internally toothed ring member coaxial with the driven shaft meshing with one of the pinions on a lay shaft and the opposite pinion on the other lay shaft, and reversing gear including a pinion slidably mounted on the driven shaft, outside said discs, a pinion on each said lay shaft also outside said discs, a pair of idle wheels carried outside said frames, each meshing with one outside pinion of a lay shaft, and actuating means for reciprocating the pinion on the driven shaft in and out of engagement with the said idle wheels.

In testimony whereof I affix my signature.

JAMES FARLEY.